June 5, 1962
H. S. MICKLEY
3,037,475
SIGNAL BEACON
Filed March 19, 1957
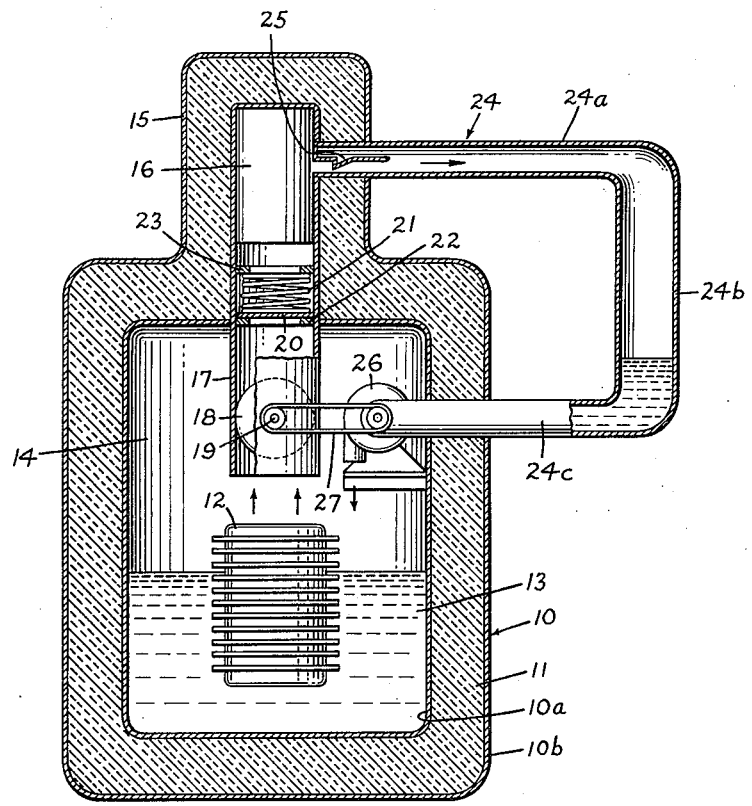
INVENTOR
HAROLD S. MICKLEY
BY
HIS ATTORNEYS 3,037,475
SIGNAL BEACON
Harold S. Mickley, Belmont, Mass., assignor to Fairchild
Stratos Corporation, a corporation of Maryland
Filed Mar. 19, 1957, Ser. No. 647,016
2 Claims. (Cl. 116—26)

This invention relates to oceanic signal beacons of a type which may be stationed above or below the water to establish identification points or lanes of travel for ships. The present invention is particularly suited as an aid to navigation for ships, such as submarines, which do not have access to celestial navigational aids. The rapid advances in submarines have made it possible for them to spend more time submerged. Hence, there is a need for a system of navigation consisting of a network of signal beacons, anchored in predetermined locations, which emit signals that can be detected by ships and used advantageously for determining their positions.

The signal beacon of the present invention comprises a housing which is adapted to be either partially or totally immersed beneath the level of the water and suitably anchored to the ocean floor. A chamber is formed within the housing, and the chamber contains a volatile liquid therein from which vapor is evolved in a vapor region defined within the chamber above the level of the volatile liquid. A heat generator rapidly evolves vapor from the volatile liquid. The pressure of the vapor evolved in the vapor region of the chamber, in turn, actuates a pressure operated signal or sound producing generator in communication therewith, thereby emitting a signal which is transmitted radially in all directions through the surrounding water and/or atmosphere. Since the positions of the signal beacons are charted, one or more of these signals can be detected by nearby ships and used to chart their locations with accuracy. The spacing between two nearby beacons defining a shipping lane should be such that the ranges of their signals would overlap, so that a ship could not be lost between them. Such beacons would be particularly helpful to submarines in under-ice navigation.

Because of the inaccessibility of the beacons, and in order to give them a long life, the vapor evolving heat may be generated by atomic energy and particularly an atomic energy power plant utilizing waste fissionable material.

For a more complete understanding of the present invention, reference may be had to the detailed description which follows and to the accompanying drawing wherein the FIGURE is a cross-sectional elevation view of the signal beacon of the present invention.

Referring to the drawing, a housing 10 comprising inner and outer shells 10a and 10b, respectively, separated by suitable insulation material 11, contains a chamber accommodating a heat generator 12 which is adapted to be wholly or partially submerged in a volatile liquid 13. The volatile liquid may be water, certain types of Freon, carbon tetrachloride, etc., depending on the climate in which the beacon is to be anchored. The chamber within the housing 10 is only partially filled with the volatile liquid, forming a vapor region 14 therein above the level of the liquid.

The housing 10 is formed with an upper head portion 15, and the interior 16 thereof communicates with the vapor region 14 through a vertically disposed conduit 17. The lower end of the vertically disposed conduit 17 accommodates a turbine wheel 18 which is rotatably supported therein on a shaft 19. Directly above the turbine wheel 18 is a spring urged valve 20 which is normally urged by a compression spring 21 into contact with a valve seat 22. The compression spring 21 is interposed between the valve 20 and an annular spring retaining ring 23 which is affixed within the conduit 17 above the spring. When the pressure of the evolved vapor within the vapor region 14 exceeds a certain value and exerts a force on the valve sufficient to overcome the force exerted by the spring, the valve is opened, admitting vapor into the upper end 16 of the conduit.

A vapor condensing conduit 24 is disposed outside the housing 10 in heat exchange relationship with the surrounding air and/or water and connects the upper end 16 of the housing with the vapor region 14. Thus, the vapor is cooled and condensed within the conduit 24 and returned by a pump 26 to the liquid reservoir within the housing. The conduit 24 comprises an upper, outwardly disposed leg 24a which passes through the shells 10a, 10b, a vertically extending leg 24b of somewhat larger diameter than the leg 24a, and a leg 24c which connects the lower end of the vertically disposed leg 24b with the interior of the vapor chamber 14. A whistle or vibrating device 25 is stationed at the inlet end of the conduit to emit a sound or signal which can be picked up by a nearby vessel or submarine. Obviously various types of signal producing equipment may be employed, including sonic and ultrasonic emitters, lights, sirens, gongs, etc., and a whistle is shown merely for purposes of illustration.

As explained, the pump 26 mounted within the vapor chamber 14 and at the discharge end of the conduit 24 pumps the condensed liquid back into the liquid reservoir within the housing. This pump is driven by the turbine 18 through a power transmitting belt or chain 27.

In operation, the heat generator rapidly evolves vapor from the volatile liquid 13, increasing the pressure in the vapor region 14 and opening the valve 20 to provide a flow of the vapor through the conduit 17. As the vapor flows upwardly through the conduit, the turbine 18 is driven, which, in turn, drives the pump 26. The vapor at the upper end 16 of the conduit 17 enters the entrance to the conduit 24, thereby emitting a signal or sound as the vapor passes through the whistle or sound producing device 25. The vapor is then cooled and condensed in the conduit 24, and the liquid settling in the lower leg 24c of the conduit is returned to the liquid reservoir by the pump 26.

Various radioactive materials may be utilized as the heat generating source, and waste materials previously used in other larger power generators would be ideally suited for use. For example, products resulting from the fission of atomic nuclei, such as uranium, thorium and plutonium, may be used. Also, individual isotopes, such as cesium 137 and strontium 90, and products resulting from the irradiation of atomic nuclei, such as cobalt 60 and polonium, may be used.

The radioactive material is sealed in a steel finned container with walls approximately one inch thick. This container prevents loss of the active material and also absorbs most of the gamma and beta radiation emitted, converting it into heat. The thermal energy is transferred primarily by conduction and convection from the fission material within the container to the surrounding fluid.

Obviously, by suitable design the signal emitted by the beacon may be either continuous or periodic. The valve 20 may afford a periodic operation, particularly if a quick or snap operating spring is substituted for the spring 21. In operation, pressure is built up within the vapor region 14 to a predetermined value, at which the valve 20 will open. Upon opening of the valve 20, however, the pressure is quickly reduced within the vapor chamber 14 by the flow of vapor through the conduit 17, so that after a period of operation of the signal producing device 25, the valve 20 is closed, until the pressure is again built up beyond the predetermined value. The repetition of this cycle of operation will emit a periodic signal.

The signal beacons of the present invention may be dropped or anchored at charted locations at sea and so spaced from each other as to establish a comprehensive navigational system or network. The network may be temporary or permanent. For example, it would probably be desirable to lay a permanent network of beacons to define a regular shipping lane, but not so in the case where the network defines a temporary passage through or under ice. The beacons may emit signals of different character so as to be identifiable by frequency, intensity, code or the like. Furthermore, the beacons may be dropped or anchored at locations which would be inaccessible to ordinary surface signal buoys.

The invention has been shown in a single preferred form and by way of example only, and obviously many variations and modifications may be made therein without departing from the spirit of the invention. The invention, therefore, is not to be limited to any specified form or embodiment, except in so far as such limitations are set forth in the appended claims.

I claim:

1. A signal beacon for use as a navigational aid comprising a housing containing a chamber therein which serves as a reservoir for a volatile liquid and having a vapor region therein above the level of the volatile liquid, a vapor flow passage communicating with the vapor region within the housing, a heat generator within the housing in heat-exchange relationship with the liquid for evolving vapor from the liquid, a condensing return passage forming a continuation of the vapor flow passage and communicating at its opposite end with the chamber, said condensing return passage being in heat-exchange relation with an ambient temperature substantially cooler than the temperature necessary to condense the vapor, a signal generator within said vapor flow passage and actuated by the flow of vapor through said vapor flow passage, and a normally closed valve within said entrance to the vapor flow passage to prevent the flow of vapor therethrough until the pressure within the vapor region exceeds a predetermined value.

2. A signal beacon for use as a navigational aid and powered by atomic energy comprising a housing containing a chamber therein which serves as a reservoir for a volatile liquid and having a vapor region therein above the level of the volatile liquid, an atomic reactor within the housing in heat-exchange relationship with the volatile liquid to develop heat to evolve vapor from the liquid, a closed flow passage communicating with the chamber at both the inlet and discharge ends, a portion of said flow passage being isolated from the chamber to permit the vapor to condense therein intermediate the inlet and discharge ends, a pump to return the condensate to the chamber, driven means interposed in said flow passage intermediate the inlet end and the condensate to supply the energy for driving the pump, means interposed in the flow passage intermediate the inlet end and the condensate to generate a signal, a valve in said flow passage upstream of said driven means and the signal generating means, and means urging the valve to closed position preventing flow through the flow passage until the pressure of the vapor builds up to a predetermined value.

References Cited in the file of this patent

UNITED STATES PATENTS

| | | |
|---|---|---|
| 219,374 | Whitney | Sept. 9, 1879 |
| 666,259 | Bryant | Jan. 22, 1901 |
| 2,515,472 | Rich | July 18, 1950 |
| 2,682,250 | Ulrich | June 29, 1954 |
| 2,765,414 | Gendler et al. | Oct. 2, 1956 |

OTHER REFERENCES

Publication, "Iron and Steel Engineer," April 1955, pp. 102 to 108.

"Process in Power Generation From Atomic Energy," by R. G. Lorraine.